Jan. 20, 1953     C. H. HOLSCLAW     2,626,072
MEANS FOR SUSPENDING A BOAT FROAM A TRAILER
Filed Aug. 5, 1948     2 SHEETS—SHEET 1
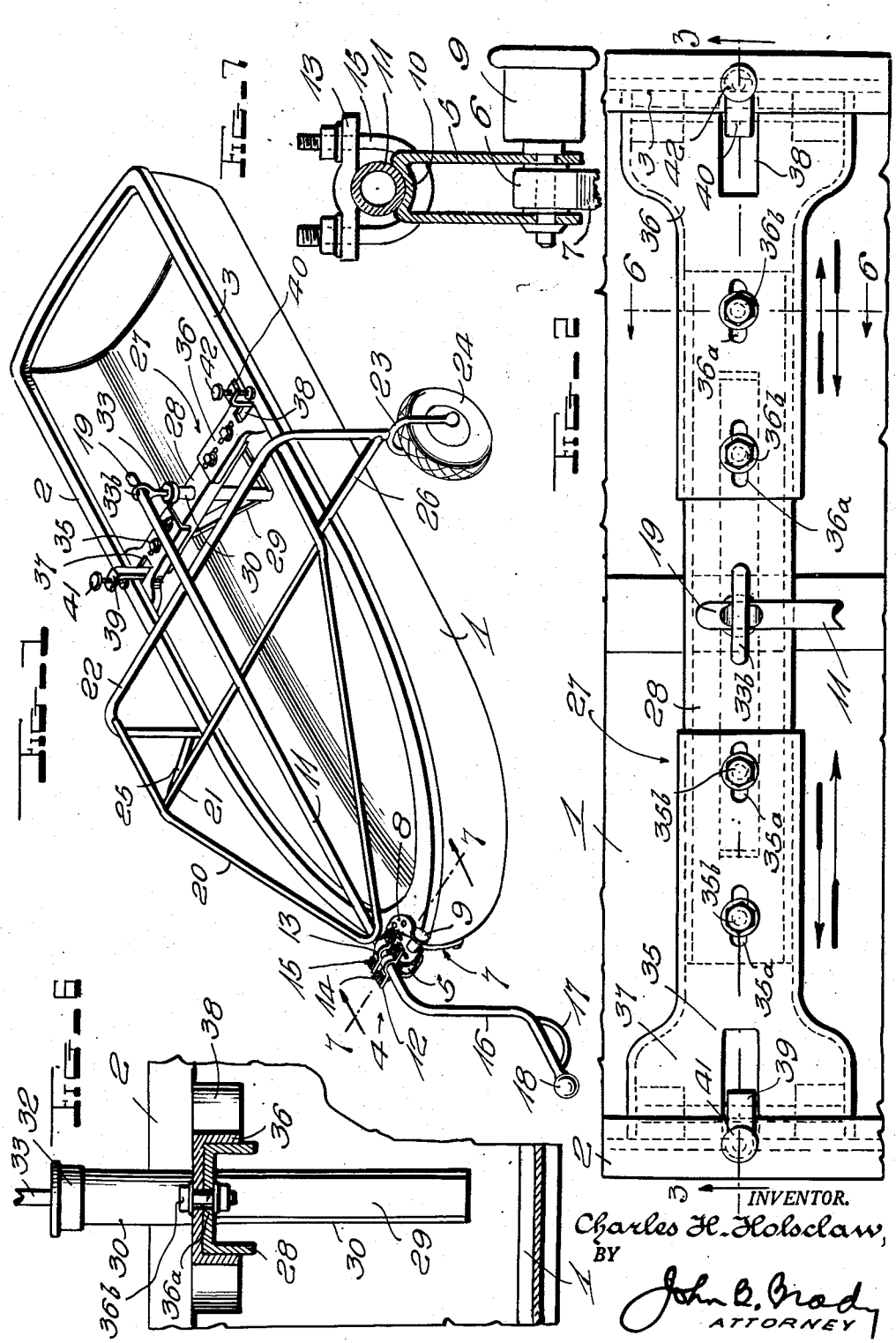
INVENTOR.
Charles H. Holsclaw,
BY
John B. Brady
ATTORNEY Jan. 20, 1953  C. H. HOLSCLAW  2,626,072
MEANS FOR SUSPENDING A BOAT FROAM A TRAILER
Filed Aug. 5, 1948  2 SHEETS—SHEET 2
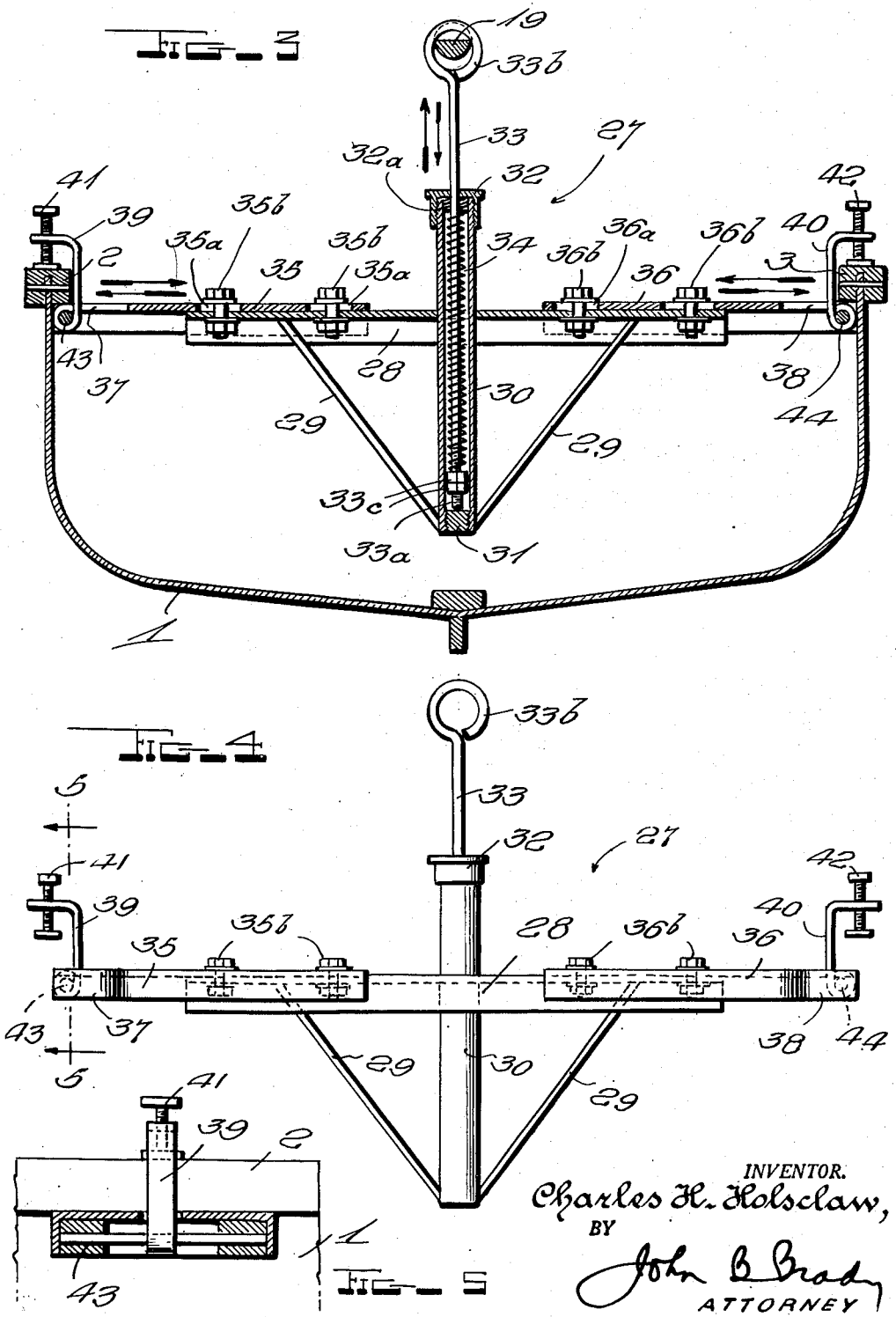

Patented Jan. 20, 1953

2,626,072

UNITED STATES PATENT OFFICE 2,626,072

MEANS FOR SUSPENDING A BOAT FROM A TRAILER

Charles H. Holsclaw, Evansville, Ind.

Application August 5, 1948, Serial No. 42,688

6 Claims. (Cl. 214—373)

My invention relates particularly to trailers for suspending and transporting boats over a roadway by motor vehicle, and facilitating the launching and retrieving of the boat.

One of the objects of my invention is to provide a constructon of suspension means attachable to a boat for mounting the boat on a trailer for transportation by motor vehicle, including special hardware adjustable to adapting the suspension means to boats of varying width.

Another object of my invention is to provide a construction of adjustable hardware for suspending a boat from a trailer where the boat may may be supported from a trailer without mutilization of the frame of the boat or permanent attachment of hardware fittings at the suspension point to the boat.

A further object of my invention is to provide a construction of adjustable transversely disposed suspension member having clamping means at opposite ends thereof and engageable with the gunwales of the boat and including a centrally disposed cylindrical housing enclosing a compression coil device yieldably operative with respect to a suspension link adapted to be engaged by a trailer for suspending and transporting the boat.

Other and further objects of my invention reside in the construction of adjustable hardware for attachment of a boat to a trailer as set forth more fully in the specification hereafter following by reference to the accompanying drawings, in which:

Figure 1 is a perspective view of a trailer and boat and the adjustable hardware suspension means located there-between in accordance with my invention; Fig. 2 is a fragmentary top plan view of the adjustable hardware attached to the gunwales of the boat; Fig. 3 is a transverse sectional view on line 3—3 of Fig. 2; Fig. 4 is an elevational view of the suspension hardware shown in Fig. 3 but illustrated detached from the boat; Fig. 5 is a cross-sectional view taken substantially on line 5—5 of Fig. 4 and illustrating one of the pivotally mounted clamping members engaged over one of the gunwales of the boat; Fig. 6 is a fragmentary cross-sectional view taken substantially on line 6—6 of Fig. 2 and showing certain of the parts in elevation; and Fig. 7 is a transverse sectional view taken on line 7—7 of Fig. 1 and showing the hardware fitting which is attached to the bow of the boat partially in section and partially in front elevation.

My invention is directed to a simplified construction of adjustable hardware for suspending a boat from a trailer where it is unnecessary to apply said hardware fittings permanently to the boat at the suspension position but wherein the suspension means may be detachably clamped to the boat without mutilization thereof. I provide a transverse suspension bar which is adjustable in width to meet conditions existing in boats of varying width and to allow hingedly mounted clamping devices to be detachably engaged over opposite gunwales of the boat. I also provide a special hardware fitting attachable to the bow of the boat and engageable with the central longitudinally extending shaft of the trailer.

Referring to the drawings in detail, reference character 1 designates a boat which for purposes of illustration has been represented as a metal bottom boat having opposite gunwales 2 and 3. In the bow section of the boat I mount a specific hardware fitting 4. The hardware fitting 4 includes a vertical plate 5 having a pair of spaced portions interconnected at their upper ends by a semi-cylindrical seat 10 and terminating on opposite sides of the fitting 6 that is attached through extension tongue 7 and plate portion 8 to the bow of the boat. The spaced portions of plate 5 are suitably secured to opposite ends of fitting 6 at the bow through suitable screw fastening means 9.

The top extremity of the plate 5 is broadened and provided with the semi-cylindrical seat 10 extending in a direction coincident with the longitudinal beam of the boat. The semi-cylindrical seat 10 receives the longitudinally extending shaft 11 of the trailer and coacts with a pair of clamping plates 12 and 13 having complementary semi-cylindrical seats therein engaging the top of the shaft 11 as shown more clearly in Fig. 7. A pair of substantially U-shaped or semi-circular bolt members 14 and 15 extend through the spaced portions of plate 5 and through the clamping plates 12 and 13 and are secured by nuts fastened thereon for clamping the hardware fitting at the bow of the boat to the shaft 11 of the trailer.

The shaft 11 has a depending end portion 16 for providing a connection between the trailer and a motor vehicle. A skid 17 is provided adjacent the depending end 16 and a coupling ball terminus 18 is provided for connection to a coacting gripping coupling at the rear of the motor vehicle. The opposite end of shaft 11 is provided with an engaging hook at 19 for engaging the suspension hardware. The trailer otherwise consists of a light-weight tubular frame including a V-shaped frame portion 20 and a crossbrace 21 and terminating in a transverse frame 22 which extends downwardly for connection to the wheel supports 23 serving as the journalling means for pneumatically tired wheels 24. Braces 25 and 26 extend diagonally between the downwardly extending ends of the transverse frame 22 and the trailer frame 20.

The hook 19 of the trailer frame engages the adjustable suspension unit 27 which is detachably connectible with the opposite gunwales of the boat. The adjustable suspension unit 27 includes the central transverse channel-shaped bar 28 through which the cylindrical housing 30 extends in a direction substantially normal to the plane of the central transverse bar 28. The cylindrical housing 30 is substantially braced with respect to the under-side of the central transverse bar 28 by braces 29 which form a substantial V-shaped structure welded to the under-side of the central transverse bar 28 at their upper ends and secured to the lower end of the cylindrical housing 30 at the apex portion of the V-shaped structure. The lower end of the cylindrical housing 30 is closed by a screw-threaded plug 31. The upper end of the cylindrical housing 30 is closed by an axially apertured cap 32 through which the suspension rod 33 is vertically removable.

The lower end of suspension rod 33 within cylindrical housing 30 is screw-threaded as represented at 33a while the upper end of suspension rod 33 is provided with an eyelet 33b. The screw-threaded end 33a is engaged by adjustable tension nuts 33c. A compression coil spring 34 fits concentrically around suspension rod 33 and is operative between the adjustable tension nuts 33c and the interior gasket 32a in the interior of cap 32 at the upper end of cylindrical housing 30. Gasket 32a substantially eliminates the entry of moisture into the interior of cylindrical housing 30 so that compression coil spring 34 operates within cylindrical housing 30 in a substantially moisture-proof enclosure. Adjustable tension nuts 33c may be adjusted along the screw-threaded end 33a of suspension rod 33 for securing the degree of tension necessary to shock-mount the boat with respect to the trailer so that sufficient yieldability in the suspension of the boat is maintained under varying conditions encountered in the launching, transportation and retrieving of the boat. Eyelet 33b is engageable by hook end 19 of the shaft 11.

The central transverse channel-shaped bar 28 is provided with a pair of adjustable extensible sections 35 and 36 which are channel shaped to conform with the channel-shaped section of the central transverse bar 28 and impart rigidity to the suspension unit. The adjustable sections 35 and 36 each contain longitudinally extending slots 35a and 36a arranged above channel-shaped bar 28 through which extend the securing bolts 35b and 36b fastened in the transverse bar 28. The adjustable sections 35 and 36 each have broadened slotted termini 37 and 38 adapted to extend under opposite gunwales 2 and 3 of the boat 1. The slotted terminus 37 has a pivotally mounted member 39 journalled therein at 43 as shown more particularly in Fig. 5. The slotted terminus 38 has pivotally mounted therein the pivot member 40 journalled at 44. The pivoted members 39 and 40 each include the manually adjustable clamping screws 41 and 42 for engaging the upper peripheral face of the gunwales 2 and 3 of the boat 1.

The adjustable suspension unit 27 is attached to the opposite gunwales of the boat 1 in a position somewhat aft of the center of gravity of the boat and between the center and the stern of the boat. The application of the adjustable suspension unit 27 is readily accomplished by lowering the suspension unit into the boat in a position immediately below the opposite gunwales, spreading the sections 35 and 36 so that the broadened slotted termini 37 and 38 extend beneath the gunwales 2 and 3. The adjustable screws 41 and 42 carried by pivotally mounted members 39 and 40 which during this process have been swung back in the nature of hinged members to retracted position toward the center of the suspension unit, are now swung outwardly to a position in which adjusting screws 41 and 42 may be engaged over the upper peripheral surface of the gunwales 2 and 3 and the adjusting screws manually adjusted to positions clamping the broadened slotted termini 37 and 38 beneath the peripheries of the opposite gunwales 2 and 3 with the adjusting screws 41 and 42 tightened against the upper peripheries of the gunwales 2 and 3. With the suspension unit thus engaged with the boat the shaft 11 of the trailer is moved into a position in which the forward end thereof may be seated in the semi-cylindrical socket recess 10 and the hook end 19 thereof engaged through the eyelet 33b of the suspension rod 33. The clamping plates 12 and 13 are then applied over the shaft 11 and the bow of the boat mounted in a position enabling the nuts to be applied to the semi-circular bolts 14 and 15 for clamping the bow of the boat to the trailer. Tension of spring 34 having been pre-determined by adjustments of nuts 33c for the mass of the boat, the trailer may now be coupled to the vehicle for transport of the boat over a highway. The boat yieldably floats on the pendant suspension formed by suspension rod 33 and is cushioned by compression coil spring 34. The launching and retrieving of the boat is accomplished by a very simple maneuver in that the attachment of the hardware to the boat may be accomplished rapidly without the employment of tools other than a wrench for turning the nuts engaging the bolts 14, 15, 35b and 36b.

Wherever in the claims I refer to "hinged members" I intend to designate the pivoted screw clamp members 39 and 40 that carry the adjustable clamping screws 41 and 42.

It will be observed that the central transverse bar 28 and the adjustable sections 35 and 36 are all disposed in a plane extending beneath the gunwales of the boat thereby offering minimum obstruction to the transportation procedures.

I have found the structure of my invention highly practical and successful in manufacture and use, and while I have described my invention in one of its preferred embodiments I desire that it be understood that modifications may be made and that no limitations upon my invention are intended other than may be imposed by the scope of the appended claims.

What I claim as new and desire to secure by Letters Patent of the United States is as follows:

1. Suspension unit for a boat comprising a transverse bar having an adjustable section on each end thereof, said sections being engageable beneath the gunwales of a boat, bifurcations formed in the outwardly directed extremities of said sections, hinge members carried by the bifurcated extremities of said adjustable sections and movable from a retracted position above said bar to a position over the opposite gunwales, an adjustable clamping screw carried by each of said hinged members and engageable with the upper surface of the gunwales, and a spring suspension device disposed centrally of said central transverse bar and engageable with the frame of a trailer.

2. An adjustable suspension unit for boats comprising a transverse bar, adjustable sections on each end of said transverse bar, and projectable beneath the gunwales of a boat, a hinge member carried by each of said adjustable sections and engageable with the upper surface of the gunwales, a tubular housing disposed centrally of said transverse bar and extending beneath and above said bar, braces projecting from the under surface of said bar and attached to said tubular housing for maintaining said housing in a substantially vertical erect position, a suspension rod disposed vertically in said housing and spring means disposed within said housing for cushioning said suspension rod whereby a trailer may be pendantly connected with the upper extremity of said rod.

3. Apparatus of the class described for suspending a boat from a trailer comprising a transverse bar insertable beneath the gunwales of a boat, broadened yoke-shaped adjustable extensions on each end of said transverse bar extendible to positions beneath the gunwales, a hinged member centrally disposed in each of the broadened yoke-shaped adjustable extensions and movable from a retracted position to a position extending over the top of the gunwales, adjustable clamping screws carried by each hinged member and engageable with the top of the gunwales, and vertically yieldable pendant suspension means mounted centrally of said transverse bar and engageable by a trailer.

4. Apparatus of the class described comprising a transverse bar insertable beneath the gunwales of a boat, adjustable extensions for each end of said transverse bar and movable to a position beneath the gunwales, said extensions each being centrally slotted at their extremities, a hinged member journaled in the extremities of each of said extensions and projecting upwardly through the slotted portions thereof and retractable toward each other to a position clearing the gunwales when said transverse bar is inserted below the gunwales and angularly movable away from each other beneath the gunwales, a clamping screw carried by each of said hinged members and engageable with the top of the gunwales when said hinged members are angularly moved to a position over the gunwales, and pendant suspension means carried by said transverse bar and engageable by a trailer.

5. Apparatus of the class described comprising a channel-shaped transverse bar insertable below the gunwales of a boat, a pair of adjustable extensions of channel-shaped section corresponding to the section of said bar and embracing each of the ends of said channel-shaped transverse bar said pair of adjustable extensions being slidably extendible to a position beneath the gunwales, clamping screws carried by the ends of said adjustable extensions and engageable with the top of the gunwales, and pendant suspension means carried centrally by said transverse bar and engageable by a trailer.

6. Apparatus of the class described comprising a transverse bar insertable below the gunwales of a boat, adjustable extensions on each end of said transverse bar engageable beneath the gunwales, pivoted members carried by the ends of said adjustable extensions, an adjustable clamping screw carried by each of said members and engageable with the top of the gunwales and a linearly disposed pendant suspension means mounted centrally of said transverse bar and engageable by a trailer.

CHARLES H. HOLSCLAW.

REFERENCES CITED

The following references are of record in the file of this patent:

UNITED STATES PATENTS

| Number | Name | Date |
| --- | --- | --- |
| 451,579 | Rinfret | May 5, 1891 |
| 1,295,065 | Riley et al. | Feb. 18, 1919 |
| 2,042,598 | Harvey | June 2, 1936 |
| 2,299,178 | Reiter | Oct. 20, 1942 |
| 2,451,236 | Oeth | Oct. 12, 1948 |
| 2,452,938 | Krake | Nov. 2, 1948 |
| 2,529,849 | Oeth | Nov. 14, 1950 |